(12) United States Patent
Kawanishi

(10) Patent No.: US 9,048,641 B2
(45) Date of Patent: Jun. 2, 2015

(54) TERMINAL BOX

(71) Applicant: Hosiden Corporation, Yao-shi (JP)

(72) Inventor: Takahide Kawanishi, Yao (JP)

(73) Assignee: Hosiden Corporation, Osaka (JP)

( * ) Notice: Subject to any disclaimer, the term of this patent is extended or adjusted under 35 U.S.C. 154(b) by 162 days.

(21) Appl. No.: 13/716,697

(22) Filed: Dec. 17, 2012

(65) Prior Publication Data

US 2014/0008120 A1 Jan. 9, 2014

(30) Foreign Application Priority Data

Dec. 19, 2011 (JP) ................. 2011-277337

(51) Int. Cl.
*H02G 3/08* (2006.01)
*H02S 40/34* (2014.01)

(52) U.S. Cl.
CPC . *H02G 3/08* (2013.01); *H02S 40/34* (2014.12)

(58) Field of Classification Search
CPC ....... H01L 31/0485; H02S 40/34; H02G 3/08
USPC ........................................................ 174/541
See application file for complete search history.

(56) References Cited

U.S. PATENT DOCUMENTS

| 6,257,900 | B1* | 7/2001 | Huang et al. .................. 439/74 |
| 7,098,397 | B2* | 8/2006 | Lange et al. .................. 174/50 |
| 7,655,859 | B2 | 2/2010 | Naβ et al. |
| 7,705,234 | B2* | 4/2010 | Feldmeier et al. ............ 136/251 |
| 2003/0188882 | A1* | 10/2003 | Asao et al. ................. 174/65 R |
| 2012/0060919 | A1 | 3/2012 | Mills et al. |
| 2012/0122336 | A1* | 5/2012 | Eusterholz .................... 439/502 |

FOREIGN PATENT DOCUMENTS

| DE | 10334935 B3 | 12/2004 |
| DE | 202009012176 U1 | 12/2009 |
| JP | 2011503884 A | 1/2011 |
| WO | 2009062326 A2 | 5/2009 |
| WO | 2010067466 A1 | 6/2010 |

* cited by examiner

*Primary Examiner* — William H Mayo, III
*Assistant Examiner* — Hiram E Gonzalez
(74) *Attorney, Agent, or Firm* — The Webb Law Firm

(57) ABSTRACT

A terminal box includes a box body forming a recessed portion and a terminal board accommodated within the recessed portion and providing conduction between a tab of a solar cell panel and a power line. The terminal board includes a projecting portion projecting from the box body toward the solar cell panel, and a spring portion extended along a direction perpendicular to the projecting direction of the projecting portion. The projecting portion includes a contact portion for contacting the tab of the solar cell panel. The projecting portion is supported by a first-side end of the spring portion. The spring portion has a meander structure having a plurality of folded portions in a plane having a normal line perpendicular to both the projecting direction of the projecting portion and the extending direction of the spring portion.

6 Claims, 7 Drawing Sheets

TERMINAL BOX

BACKGROUND OF THE INVENTION

1. Field of the Invention

The present invention relates to a terminal box having a terminal board for connecting a tab of a solar cell panel to a power line.

2. Description of the Related Art

Generally, a solar cell module includes a plurality of solar cell panels, with a terminal box being mounted on the back face of each solar cell panel. This terminal box includes a terminal board for establishing conduction between the tab of the solar cell panel and the external power line. Hence, it is necessary for a portion of the terminal board to be contacted to the tab of the solar cell panel.

Various arrangements are possible for the tab of the solar cell panel, including a mode of arrangement in which the tab is mounted on the back face of the solar cell panel (this will be referred to as "the first mode of arrangement" hereinafter), another mode of arrangement in which the tab is disposed inside the solar cell panel adjacent its back face (this will be referred to as "the second mode arrangement" hereinafter). For contacting the tab arranged as above with the terminal board, it is needed to ensure that the terminal board projects from the main body of the terminal box.

On the other hand, if the amount of projection of the terminal box is inappropriate, the terminal box may fail to contact the tab, thus resulting in conduction failure. Conversely, if the projection amount is too large, this may cause the terminal box to "float off", i.e. to detach from, the back face of the solar cell panel, thus forming a gap that allows intrusion of rainwater or the like therethrough to the inside of the terminal box. For this reason, appropriate setting is required for the projection amount of the terminal box according to varied specifications of the solar cell panel.

However, the appropriate projection amount of terminal board differs according to the specification of the solar cell panel. The appropriate projection amount may differ according also to the difference of the above-described mode of arrangement. For this reason, it is necessary to adjust the projection amount of the terminal board according to the specification of the solar cell panel employed. However, this adjustment is troublesome and increases the cost of installment. Further, the terminal box too needs to be configured to allow adjustment of the projection amount of terminal board. This leads to increase in the manufacture cost of the terminal box disadvantageously. Alternatively, it is conceivable to prepare and employ terminal boards set with differing projection amounts. This is also disadvantageous since it invites manufacture cost increase of the terminal box again.

In an attempt to overcome the above problem, WO 2010/067466 discloses a terminal box configured such that spring-like characteristics is provided to the leading end of the terminal board disposed substantially parallel with a solar cell panel. Japanese Patent Application National Transfer Publication No. 2011-503884 discloses a terminal box wherein an elastic part is formed in an intermediate portion of the terminal board. With these arrangements, reliable connection between the terminal board and the tab can be ensured by the spring-like property characteristics of the terminal board if a relatively large projection amount of the leading end of the terminal board is set in advance. Further, as a pressing force resulting from the connection is absorbed by the spring-like characteristics of the leading end of the terminal board, the floating phenomenon of the terminal box can be prevented also.

However, with the terminal boxes disclosed in WO 2010/067466 and Japanese Patent Application National Transfer Publication No. 2011-503884, because an elastic part is formed at the leading end or intermediate portion of the terminal board, the adjustability of the projection amount of terminal board is not so large. Also, with the terminal box disclosed in Japanese Patent Application National Transfer Publication No. 2011-503884, since an elastic part is formed upwardly of a soldering zone (a portion to be soldered to the tab of the terminal board), the elastic part may hinder the soldering operation.

The present invention has been made in view of the above-described state of the art and its object is to provide a terminal box that allows easy adjustment of the projection amount of the terminal board.

SUMMARY OF THE INVENTION

According to one preferred embodiment of a terminal box relating to the present invention, the terminal box comprising:

a box body forming a recessed portion; and a terminal board accommodated within the recessed portion and providing conduction between a tab of a solar cell panel and a power line;

wherein the terminal board includes a projecting portion projecting from the box body toward the solar cell panel, and a spring portion extended along a direction perpendicular to the projecting direction of the projecting portion;

the projecting portion includes a contact portion for contacting the tab of the solar cell panel;

the projecting portion is supported by a first-side end of the spring portion; and the spring portion comprises a meander structure having a plurality of folded portions in a plane having a normal line perpendicular to both the projecting direction of the projecting portion and the extending direction of the spring portion.

With the above arrangement, a contact portion is formed at the projecting portion which projects from the box body toward the solar cell panel and this contact portion comes into contact with the tab of the solar cell panel. Therefore, upon establishment of the contact between the contact portion and the tab, a force is applied to the projecting portion in its retracting direction (the direction opposite the solar cell panel). As this projecting portion is supported by the first-side end of the spring portion disposed along the direction perpendicular to the projecting direction of the projecting portion, the force applied to the projecting portion is transmitted as a force along a direction bending the spring portion. Therefore, the contact between the contact portion and the tab can be maintained appropriately by the bending elasticity of the spring portion, thus effectively preventing the contact failure. Further, since this force applied to the projecting portion is absorbed by the spring portion, the floating phenomenon of the box body can be prevented. Moreover, even when the projection amount of the projecting portion is small, the projection amount can be adjusted largely, thanks to the bending elasticity of the spring portion.

Further, with the above arrangement, the spring portion is configured as a meander structure having a plurality of folded portions in a plane having a normal line which is perpendicular to both the projecting direction of the projecting portion and the extending direction of the spring portion. With this, when viewed along the projecting direction of the projecting portion, only the thickness portion of the spring portion is visible. That is, when viewed as above, the spring portion will show only as a linear form. Therefore, the presence of the spring portion does not impair the visibility of the contact portion, so that the soldering operation between this contact portion and the tab can be carried out easily.

According to a preferred embodiment of the terminal box relating to the present invention, the terminal box further comprises a displacement maintaining portion for maintaining a displaced state of the projecting portion displaced along its projecting direction.

As described above, the projecting portion is supported to the end of the spring portion and a force along the bending direction is applied to the spring portion when the projecting portion (contact portion) comes into contact with the tab. In this, if the amount of retraction of the projection portion is large, a large elastic resilient force will be generated in the spring portion. This elastic resilient force is effective in the direction of detaching the terminal box from the solar cell panel (this direction will be referred to as "the detaching direction"). However, with the above-described arrangement, the displacement maintaining portion maintains the displaced state of the projecting portion displaced along the projecting direction. Namely, the elastic resilience of the spring portion will be supported by the displacement maintaining portion. With this, even when a large elastic resilient force is generated in the spring portion, the force in the detaching direction applied to the terminal box can be reduced. In this way, the reduction of the force in the detaching direction applied to the terminal box can eliminate necessity of such an inconvenient operation of keeping the terminal box pressed until adhesive agent applied for bonding the terminal box to the solar cell panel is cured to provide appropriate bonding force.

Such displacement maintaining portion can be realized with a simple arrangement as follows. Namely, the displacement maintaining portion can include an engaging pawl formed in one of the projecting portion and the box body and an engaged portion formed in the other of the projecting portion and the box body, the engaged portion being engageable with the engaging pawl at one of a plurality of positions.

According to a further preferred embodiment of the terminal box relating to the present invention, the terminal board includes a supported portion to be supported to the box body, the supported portion being provided at a second-side end opposite the first-side.

With the above-described arrangement, the supported portion will serve as a "pivot" for supporting the force applied to the projecting portion. Further, since the projecting portion is supported to the first-side end of the spring portion and the supported portion is provided at the second-side end, a large distance can be secured between the pivot and the point of force or leverage application. Therefore, a large force can be supported effectively.

According to a still further preferred embodiment of the terminal box relating to the present invention, the terminal box further comprises a pair of said spring portions and a support portion disposed between the first-side ends of the pair of spring portions, and the projecting portion is supported at an approximately center position of the support portion along its disposing direction.

With the above-described arrangement, the projecting portion, in particular, the contact portion, can be exposed from the space formed between the pair of spring portions, so that the soldering operation between the contact portion and the tab can be further facilitated. Moreover, since the projecting portion is supported by the pair of spring portions via the support portion, the projecting portion can be supported in a stable manner.

According to a still further preferred embodiment of the terminal box relating to the present invention, the terminal board has an approximately rectangular shape having four sides, and the spring portions are formed in the two sides adjacent the side along the first-side, and an external connecting portion for connecting the power line is formed in the second-side.

With the above-described arrangement, the projecting portion and the external connecting portion are formed in the sides opposite each other. This arrangement makes it difficult for the force applied to the projecting portion to be transmitted to the external connecting portion. Thus, when a force is applied to the connecting portion between the external connecting portion and the power line, it is possible to prevent deterioration of the connection conditions therebetween.

DETAILED DESCRIPTION OF THE PREFERRED EMBODIMENT

Figure 1:
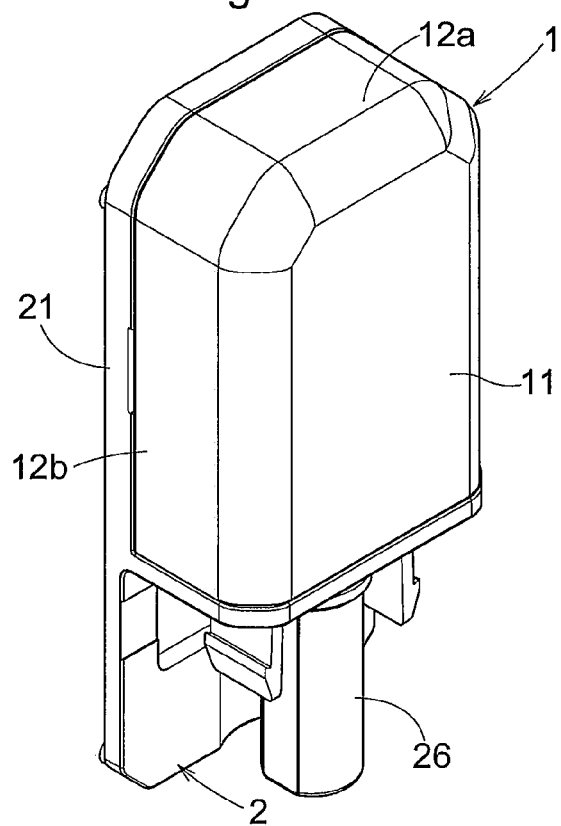
FIG. 1 is a perspective view showing a terminal box of the present invention as viewed from its upper side.
Figure 2:
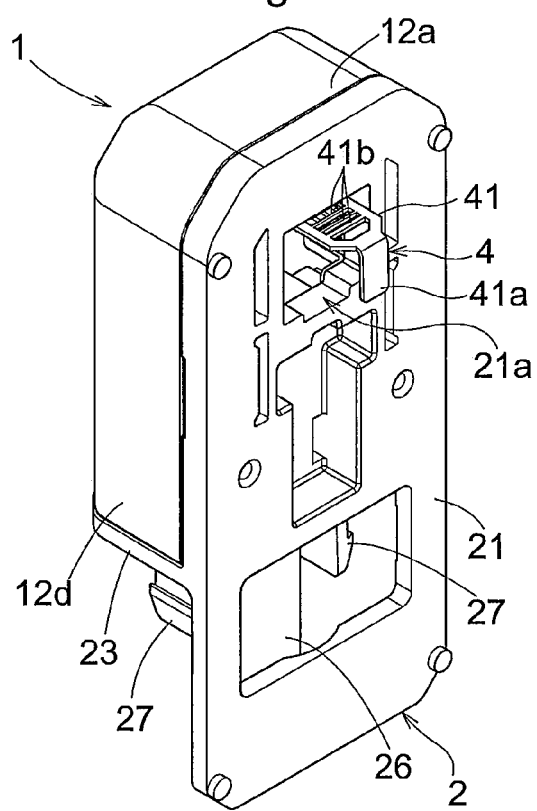
FIG. 2 is a perspective view showing the terminal box of the present invention as viewed from its lower side.
Figure 3:
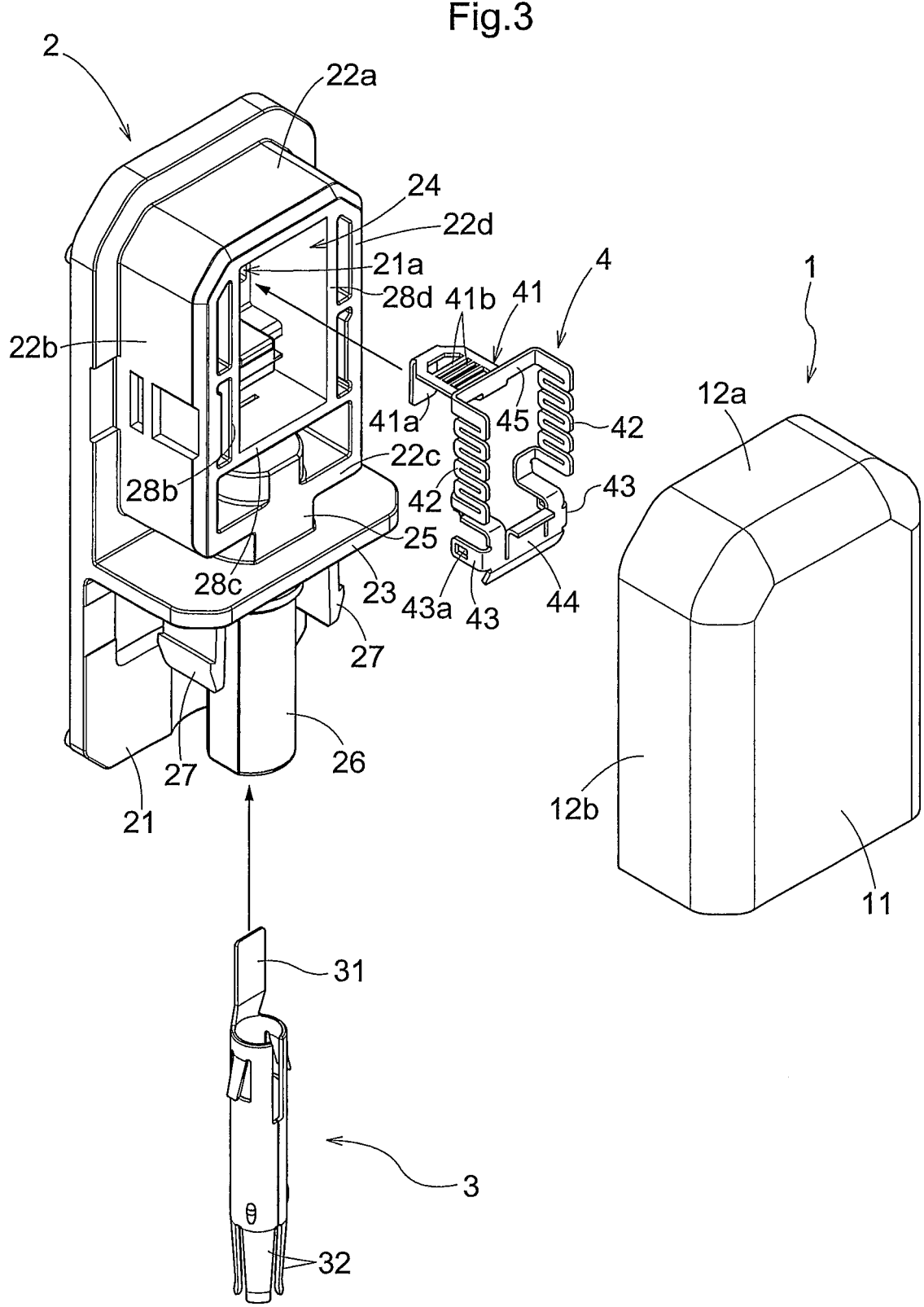
FIG. 3 is an exploded perspective view of the terminal box of the present invention.
Figure 4:
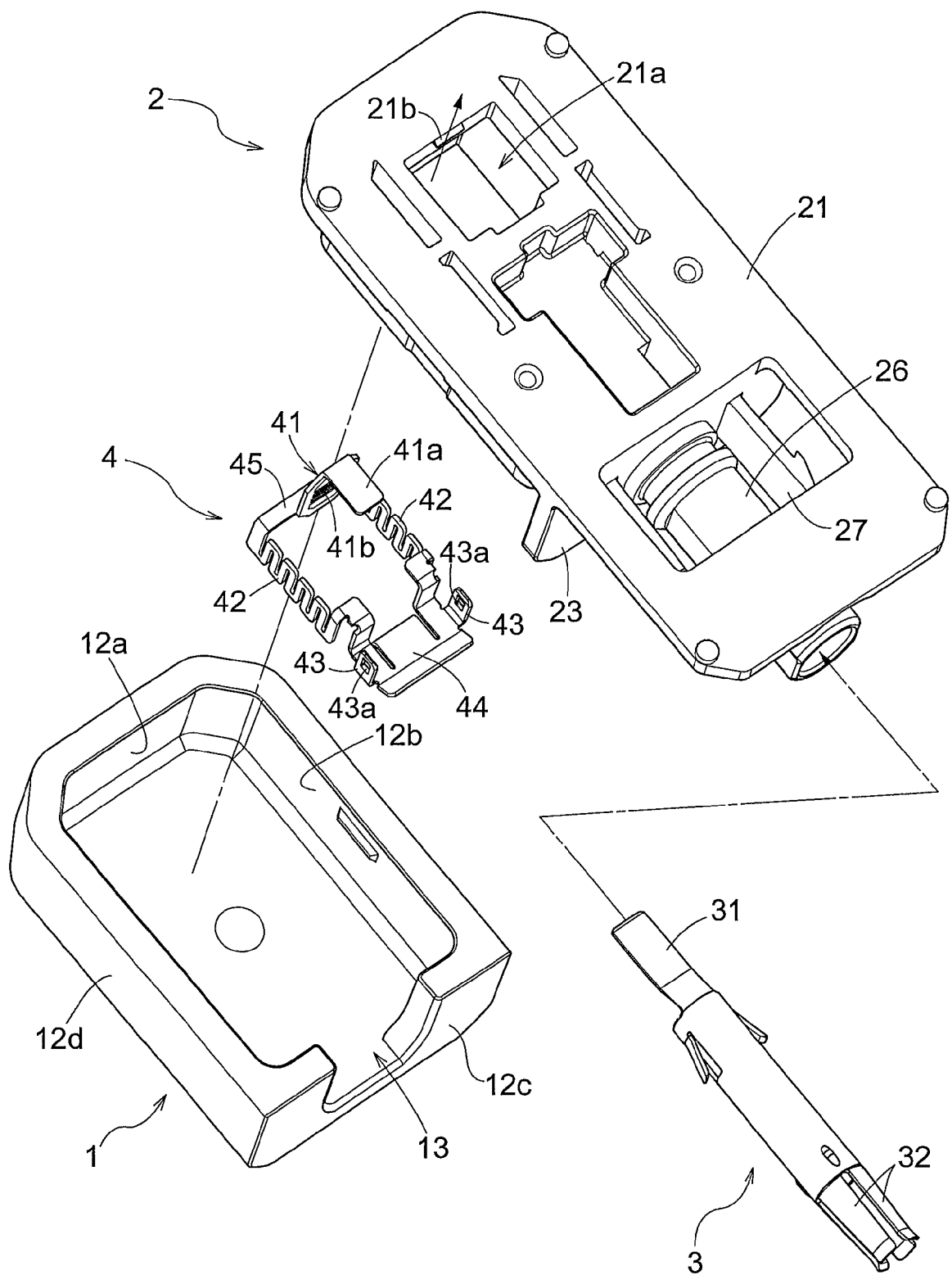
FIG. 4 is an exploded perspective view of the terminal box of the present invention.

Next, with reference to the accompanying drawings, an embodiment of the terminal box relating to the present invention will be described. FIGS. 1 and 2 are perspective views showing the terminal box according to the instant embodiment as viewed from its upper side and lower side, respectively. FIGS. 3 and 4 are exploded perspective views showing the terminal box according to the instant embodiment as viewed from its upper side and lower side, respectively. As shown in these figures, the terminal box includes, as its principal components, an upper body portion 1, a lower body portion 2 ("a box main body"), a pin 3, and a terminal board 4. It should be noted that these figures show only those portions of the above-described components of the terminal box which relate in particular to the present invention.

The upper body portion 1 includes an upper wall 11, four side walls 12*a*, 12*b*, 12*c*, 12*d* extending vertically from the upper wall 11. Therefore, the upper body portion 11 has an approximately box-like shape having a bottom opening. The side walls 12*a*, 12*b* and 12*d* respectively have a rectangular shape, whereas the side wall 12*c* has an arch-like shape defining a hole 13.

On the other hand, the lower body portion 2 includes a lower wall 21 and four side walls 22*a*, 22*b*, 22*c*, 22*d* extending vertically from the lower wall 21. On the inner sides of the side walls 22*b*, 22*c*, 22*d*, there are formed inner walls 28*b*, 28*c*, 28*d* extending vertically and in parallel with the respective side walls. The space surrounded by the side wall 22*a* and the inner walls 28*b*, 28*c*, 28*d* defines a recessed portion 24 for accommodating the terminal board 4. At the portion of the lower wall 21 corresponding to the bottom of the recessed portion 24, a hole 21*a* is formed. Further, at a predetermined distance from the side wall 22*c*, a vertical wall 23 extends vertically from the lower wall 21 and between the side wall 22c and the vertical wall 23, there is formed a connecting portion 25 having an approximately cylindrical shape.

Then, when the upper body portion 1 is engaged over the lower body portion 2 constructed as above, the recessed portion 24 of the lower body portion 2 can be sealed. More particularly, the side walls 12a, 12b, 12c, 12d of the upper body portion 1 come into contact respectively with the side walls 22a, 22b, 22c, 22d of the lower body portion 2 from the outside thereof. In the course of this, the outer face of the side wall 12c of the upper body portion 1 comes into contact with the face (this will be referred to as the "inner face" hereinafter) of the vertical wall 23 of the lower body portion 2 which face defines the recessed portion 24. Further, into the hole 13 defined in the side wall 12c of the upper body portion 1, the connecting portion 25 of the lower body portion 2 will come into engagement. In this way, the recessed portion 24 of the lower body portion 2 can be sealed.

The face (this will be referred to as the "outer face" hereinafter) on the side opposite (this side will be referred to as the "outer side" hereinafter) the side of the vertical wall 23 defining the recessed portion 24 forms a cylindrical portion 26. Into this cylindrical portion 26, there is inserted the pin 3 in which the power line is inserted. Further, from the vertical wall 23 toward the outer side, a pair of retaining pawls 27 extend.

The pin 3 comprises a conductive member having an approximately cylindrical shape. Into this pin 3, a conductive member connected to the power line will be inserted. With this, electric conduction is established between the power line and the pin 3. At the terminal end of the pin 3 to be inserted into the terminal box, there is provided a tongue-like portion 31 to be connected to the terminal board 4. Therefore, the pin 3 will be inserted such that the tongue-like portion 31 is exposed to the recessed portion 24 through the cylindrical portion 26 and the connecting portion 25 (see FIG. 5 and FIG. 6). Incidentally, a different arrangement may be provided wherein the pin 3 is connected to a power line having its conductive wire exposed with stripping of its outer sheath.

Further, at the terminal end of the pin 3 opposite the side having the tongue-like portion, there is formed a retaining portion 32 for maintaining the conductive member connected to the power line. In this retaining portion 32, there are formed a plurality of slits extending along the axial direction for forming an inner diameter smaller than that of the rest.

The terminal board 4 is formed of a conductive material and includes a projecting portion 41 projecting downwards, a pair of spring portions 42 supporting the projecting portion 41, a pair of supported portions 43 supported by the lower body portion 2 and an external connecting portion 44 on which the tongue-like portion 31 of the pin 3 is to be placed. Each spring portion 42 supports the projecting portion 41 at the first-side end thereof and supports the supported portion 43 at the second-side end opposite the first-side.

Figure 5:
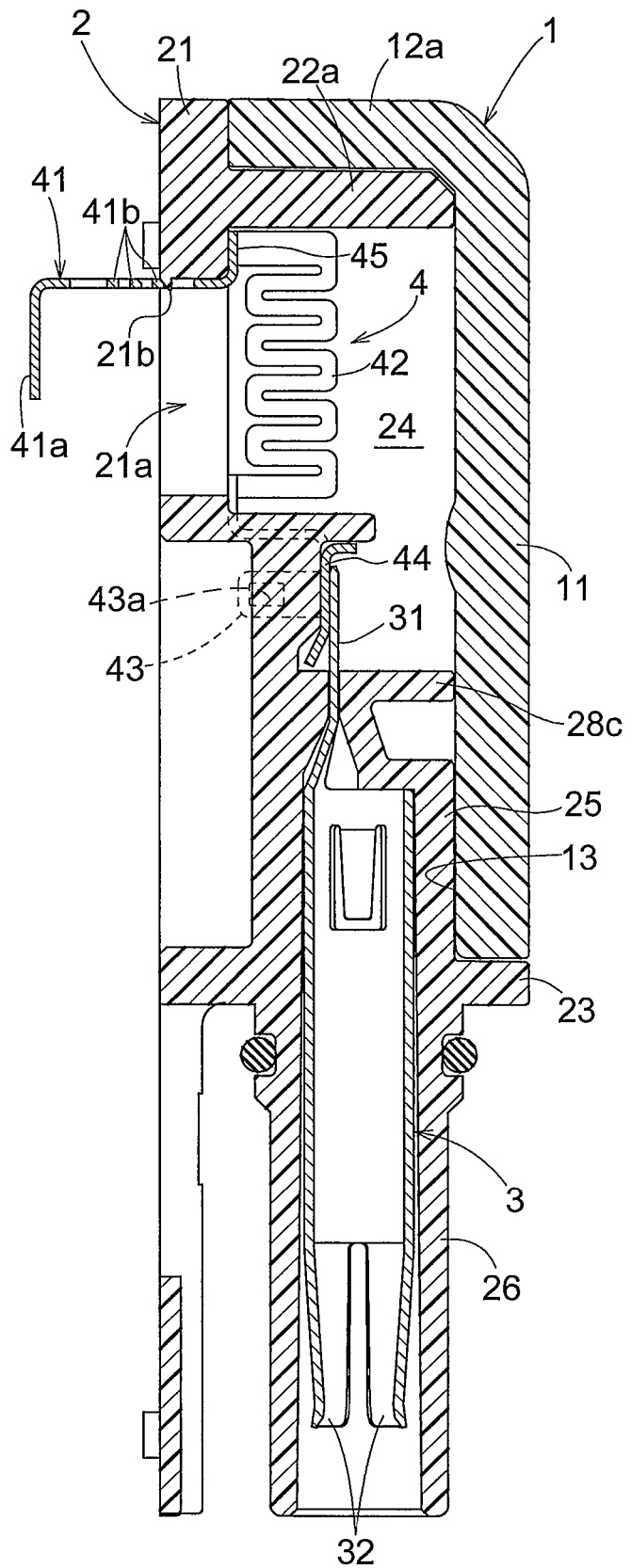
FIG. 5 is a section view of the terminal box of the present invention.
Figure 6:
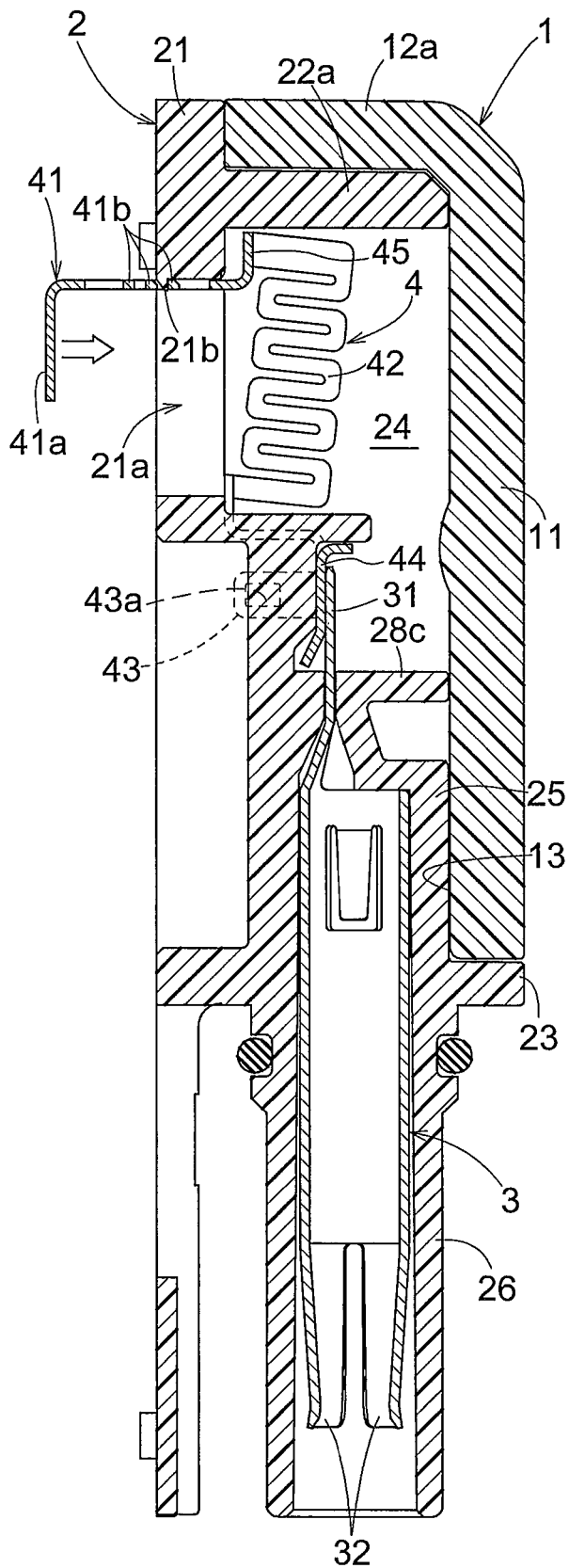
FIG. 6 is a section view showing the terminal box of the present invention at the time of its mounting.

FIGS. 5 and 6 are section views of the terminal box according to the instant embodiment taken along a section line extending along the inner walls 28b, 28d (this direction will be referred to as the "fore/aft direction" hereinafter). As shown, the spring portions 42 are accommodated in the recessed portion 24 of the lower body portion 2 in such a manner that the longitudinal direction thereof is aligned with the fore/aft direction of the terminal box. In this, the length of the projecting portion 41 is set such that this projecting portion 41 may project from the lower wall 21 of the lower body portion 2 through the hole 21a of the lower body portion 2. After the terminal board 4 is accommodated in the recessed portion 24 and a soldering is provided between the connecting portion of the projecting portion and the tab of the solar cell panel as will be described later, an amount of filling material will be charged into the recessed portion 24, thus sealing this recessed portion 24.

The projecting-side terminal end of the projecting portion 41 is bent inwards at an approximately right angle, thus forming a contacting portion 41a to contact and be connected to the tab of the solar cell panel. Hence, the terminal box will be mounted to the back face of the solar cell panel with the tab and the connecting portion 41a being in contact with each other, these components will be soldered to each other. With this, electrical conduction will be established between the solar cell panel and the terminal board 4.

As described above, the spring portions 42 are accommodated in the recessed portion 24 with their longitudinal direction being aligned with the fore/aft direction. And, between the side wall 22a side ends of the pair of spring portions 42, there is provided a supporting portion 45 that extends in the direction along the side wall 22a (this direction will be referred to as the "right/left direction" hereinafter). The projecting portion 41 is supported at the approximately right/left center of this supporting portion 45. With use of such arrangement as above, the projecting portion 41 can be supported in a stable manner.

Further, at the ends of the spring portions 42 opposite the sides provided with the projecting portion 41, there are provided a pair of supported portions 43. These supported portions 43 respectively define engaging holes 43a in which engaging projections (not shown) formed in the inner wall face of the recessed portion 24 of the lower body portion 2 can engage. With this engagement, the terminal board 4 is supported to the lower body portion 2.

Between the pair of supported portions 43, there is formed the external connecting portion 44 which is substantially flat. As described hereinbefore, on this external connecting portion 44, the tongue-like portion 31 of the pin 31 will be placed and then the external connecting portion 44 and the tongue-like portion 31 will be soldered to each other. With this, via the pin 3, conduction is established between the terminal board 4 and the power line, thus establishing electric conduction between the solar cell panel and the power line.

Each spring portion 42 has a meandering (zigzagging) structure having a plurality of folded portions in the plane extending along the inner faces of the side walls 22b, 22d of the lower body portion 2. Therefore, the spring portion 42 has bending elasticity in the direction along the projecting direction of the projecting portion 41 (this direction will be referred to as the "projecting/retracting direction", the increasing direction will be referred to as the "projecting direction" and the decreasing direction will be referred to as the "retracting direction", respectively, hereinafter). This bending elasticity serves to facilitate adjustment of the projection amount of the projecting portion 41.

Further, when the terminal box is mounted on the back face of the solar cell panel, a reaction force from the solar cell panel will be applied to the projecting portion 41. In this, this reaction force can be absorbed by the bending elasticity of the spring portion 42. Thus, even when a significant reaction force along the retracting direction is applied to the projecting portion 41, as this reaction force is absorbed by the bending elasticity of the spring portion 42, the floating phenomenon of the terminal box can be prevented by this reaction force.

Conversely, even when there exists shortage in the projection amount of the projecting portion 41, as the bending elasticity of the spring portion 42 allows large adjustment of the projection amount of the projecting portion 41, reliable contact between the contacting portion 41a and the tab can be realized, thus effectively preventing occurrence of contact failure.

As described hereinbefore, the terminal board 4 is supported to the lower body portion 2 via the supported portions 43 and the projecting portion 41 and the supported portions 43 are provided on the opposed ends of the spring portions 42. With this arrangement, a large distance can be secured between the point of force application of the reaction force applied from the solar cell panel to the terminal board 4 and the pivot point, thus increasing the reaction force that can be supported by the spring portions 42.

Figure 7:
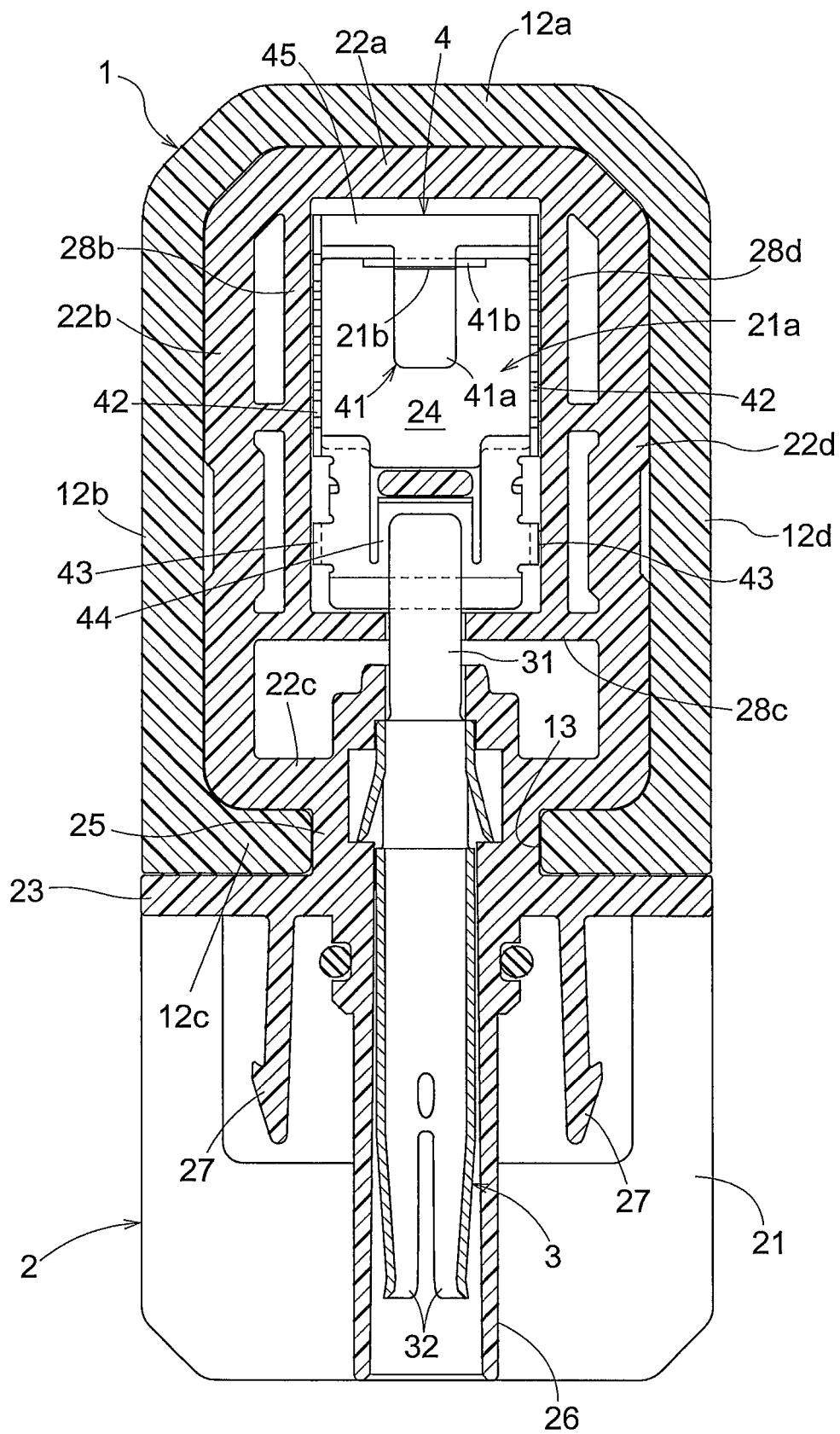
FIG. 7 is a section view of the terminal box of the present invention.

Each spring portion 42 is formed of a plate-like member having a face extending along the inner face of the side walls 22c, 22d of the lower body portion 2. Hence, when the terminal board 4 is viewed from the above, a space is formed between the pair of spring portions 42 as shown in the section view of FIG. 7 along the section line parallel with the lower wall, and through this space, the contacting portion 41a can be seen or exposed. Moreover, as the plate-like spring portions 42 are disposed in opposition to each other, the above space can be formed large. Therefore, through this space formed between the pair of spring portions 42, the contacting portion 41a and the tab can be soldered to each other. In this way, the soldering work can be carried out with ease.

As described hereinbefore, with the bending elasticity of the spring portions 42, the reaction force applied to the projecting portion 41 from the solar cell panel can be supported effectively. However, if a significant bending force is applied to the spring portions 42, the resulting elastic resilient forces of the spring portions 42 will be large, and these forces will act as forces tending to detach the terminal box from the solar cell panel, so that the assembling of the terminal box may be hindered.

In order to avoid the above, the terminal box according to the present invention includes a displacement maintaining portion for maintaining a displaced state of the projecting portion 41 displaced along its projecting/retracting direction. In the instant embodiment, this displacement maintaining portion consists essentially of a ladder-like portion 41b (an example of "engaged portion" in the invention) formed in the projecting portion 41, and an engaging pawl 21b formed in the inner wall face of the hole 21a defined in the lower body portion 2. More particularly, the ladder-like portion 41b includes a plurality of bar-like members extending along the right/left direction, to each one of the bar-like members, the engaging pawl 21b is engageable.

As shown in FIG. 5, when the projecting portion 41 is not displaced, the engaging pawl 21b is located upwardly of the plurality of bar-like members of the ladder-like portion 41b, not engaging any of these bar-like members. On the other hand, as shown in FIG. 6, when the projecting portion 41 is displaced in the retracting direction, this will bring the engaging pawl 21b to a position downwardly of one of the bar-like members. In this, the elastic resilient force of the spring portion 42 will be applied to the projecting portion 41, but, the engagement between the engaging pawl 21b and one bar-like member prevents the displacement of the projecting portion 41 in the projecting direction.

As described above, as the terminal box is provided with the displacement maintaining portion for maintaining the displaced state of the projecting portion 41, when the terminal box is fixed and bonded to the back face of the solar cell panel, the floating phenomenon of the terminal box can be effectively prevented, so that the reliability of bonding can be increased.

Figure 8:
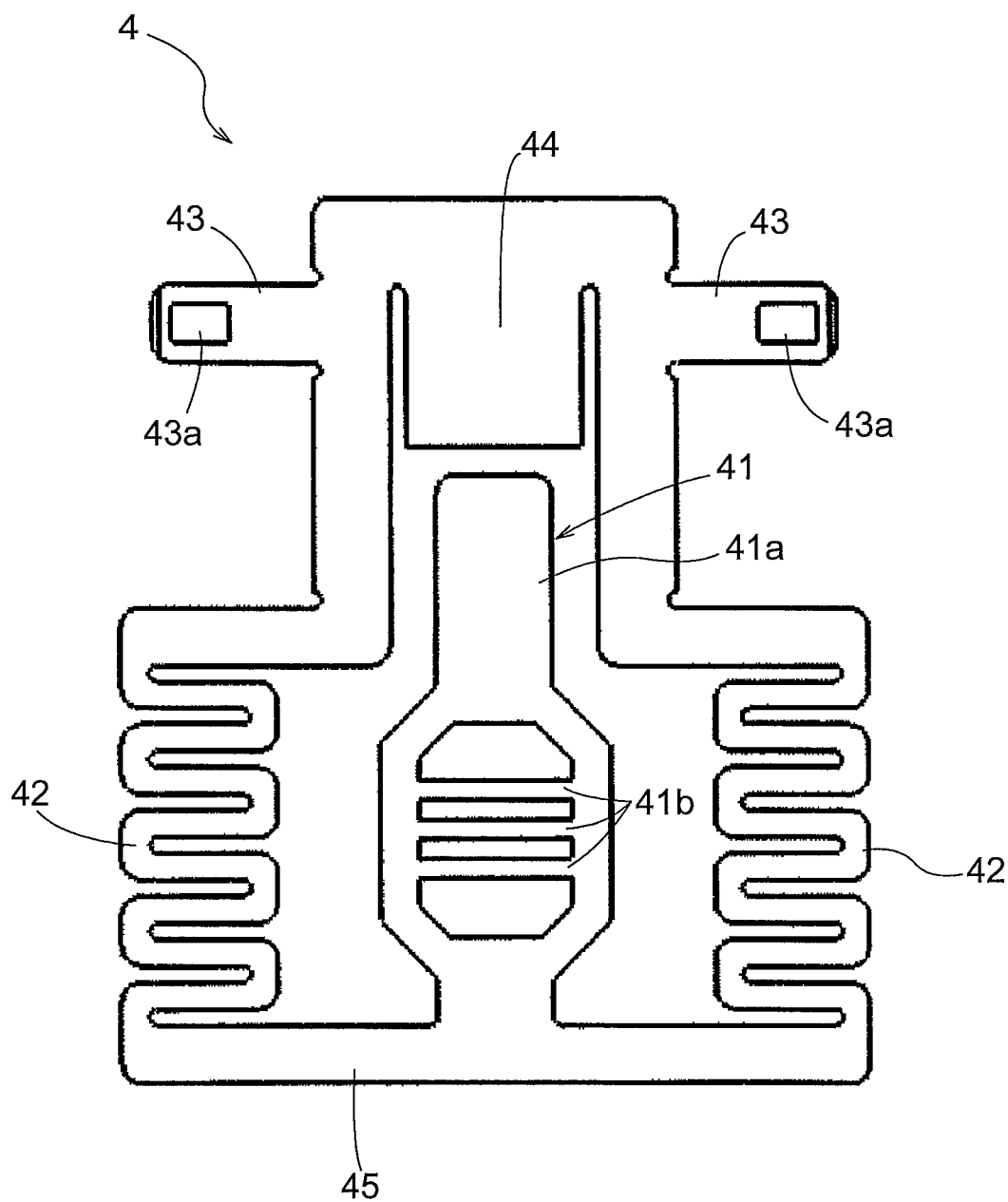
FIG. 8 is a development view of the terminal board of the present invention.

FIG. 8 is a development view of the terminal board 4. As may be apparent from this figure, the terminal board 4 is formed by punching and pressing of a single flat sheet of conductive material. In this way, the projecting portion 41 is formed between the pair of spring portions 42. The amount of material needed for this terminal board 4 can be small and the amount of material to be wasted can be correspondingly reduced also. Moreover, a mold for use in the punching or pressing can be small. As these all contribute to reduction of manufacturing cost, they are advantageous.

Other Embodiments (1) In the foregoing embodiment, the engaging pawl 21b is formed in the lower body portion 2 and the ladder-like portion 41b is formed in the projecting portion 41 of the terminal board. Instead, the ladder-like portion can be formed in the lower body portion 2 and the engaging pawl can be formed in the projecting portion of the terminal board. Further alternatively, the engaged portion can be embodied not as a ladder-like portion, but may be embodied in any other form.

(2) In the foregoing embodiment, the displacement maintaining portion is configured to check or hinder displacement of the projecting portion 41 in the projecting direction. Conversely, the displacement maintaining portion can be configured to check or hinder displacement of the projecting portion 41 in the retracting direction. With this alternative configuration of the displacement maintaining portion, when adjustment is made to increase the projection amount of the projecting portion 41, inadvertent retraction of the projecting portion 41 can be effectively prevented, so that contact failure between the contact portion 41a and the tab can be avoided.

The invention claimed is:

1. A terminal box comprising:
a box body forming a recessed portion; and
a terminal board accommodated within the recessed portion and providing conduction between a tab of a solar cell panel and a power line;
wherein the terminal board includes a projecting portion projecting from the box body toward the solar cell panel, and a spring portion extended along a direction perpendicular to the projecting direction of the projecting portion;
the projecting portion includes a contact portion for contacting the tab of the solar cell panel;
the projecting portion is supported by a first-side end of the spring portion;
the spring portion comprises a meander structure having a plurality of folded portions in a plane having a normal line perpendicular to both the projecting direction of the projecting portion and the extending direction of the spring portion; and
the plurality of folded portions are arranged along the extending direction of the spring portion.

2. The terminal box according to claim 1, further comprising a displacement maintaining portion for maintaining a displaced state of the projecting portion displaced along its projecting direction.

3. The terminal box according to claim 2, wherein the displacement maintaining portion includes an engaging pawl formed in one of the projecting portion and the box body and an engaged portion formed in the other of the projecting portion and the box body, the engaged portion being engageable with the engaging pawl at one of a plurality of positions.

4. The terminal box according to claim 1, wherein the terminal board includes a supported portion to be supported to the box body, the supported portion being provided at a second-side end opposite the first-side.

5. The terminal box according to claim 1, further comprising:
- a pair of said spring portions;
- a support portion disposed between the first-side ends of the pair of spring portions, and
- the projecting portion being supported at an approximately center position of the support portion along its disposing direction.

6. The terminal box according to claim 5, wherein:
- the terminal board has an approximately rectangular shape having four sides;
- the spring portions are formed in the two sides adjacent the side along the first-side; and
- an external connecting portion for connecting the power line is formed in the second-side.

* * * * *